(12) United States Patent
Kruse et al.

(10) Patent No.: US 12,428,823 B2
(45) Date of Patent: Sep. 30, 2025

(54) WATER FAUCET WITH SCALD PROTECTION

(71) Applicant: Grohe AG, Hemer (DE)

(72) Inventors: Jan Niclas Kruse, Dortmund (DE); Christian Bolz, Dortmund (DE); Sascha Menges, Hemer (DE); Pia Schadow, Hemer (DE); Dajana Lazic, Iserlohn (DE)

(73) Assignee: GROHE AG, Hemer (DE)

( * ) Notice: Subject to any disclaimer, the term of this patent is extended or adjusted under 35 U.S.C. 154(b) by 0 days.

(21) Appl. No.: 18/722,284

(22) PCT Filed: Nov. 25, 2022

(86) PCT No.: PCT/EP2022/083332
§ 371 (c)(1),
(2) Date: Jun. 20, 2024

(87) PCT Pub. No.: WO2023/117302
PCT Pub. Date: Jun. 29, 2023

(65) Prior Publication Data
US 2025/0059741 A1 Feb. 20, 2025

(30) Foreign Application Priority Data
Dec. 21, 2021 (DE) .......................... 102021134177.9

(51) Int. Cl.
*E03C 1/04* (2006.01)
*F16K 11/00* (2006.01)
*F16K 11/072* (2006.01)

(52) U.S. Cl.
CPC ............ *E03C 1/041* (2013.01); *F16K 11/072* (2013.01); *F16K 19/006* (2013.01)

(58) Field of Classification Search
CPC ...... E03C 1/041; E03C 1/0412; F16K 11/072; F16K 19/006
See application file for complete search history.

(56) References Cited

U.S. PATENT DOCUMENTS 4,423,752 A * 1/1984 Psarouthakis ......... F16K 11/072
 251/288
6,145,534 A * 11/2000 Romero .................. E03C 1/041
 16/277

(Continued)

FOREIGN PATENT DOCUMENTS

| DE | 200 20 298 | 5/2001 |
|---|---|---|
| EP | 3 372 880 | 9/2018 |
| GB | 2531142 | 4/2016 |

OTHER PUBLICATIONS

International Search Report (ISR) issued Mar. 9, 2023, in International (PCT) Application No. PCT/EP2022/083332.

*Primary Examiner* — Patrick C Williams
(74) *Attorney, Agent, or Firm* — Wenderoth, Lind & Ponack, L.L.P.

(57) ABSTRACT

A water faucet having an adjustable cartridge for the infinitely variable mixing of a cold-water flow and a hot-water flow to form a mixed-water flow, having a first adjustability, and having an operating lever, which is connected to the first adjustability via a transmission mechanism such that the mixing ratio of cold water and hot water can be set by a temperature setting motion of the operating lever, the temperature setting motion being a rotary motion about an axis of rotation, the transmission mechanism having a stop, which limits a movement of the first adjustability in the direction of more hot water at a threshold setting, the stop being designed such that the operating lever is brought into an unlocking position by an unlocking motion deviating from the temperature setting motion, such that further move- (Continued)

Figure 1:
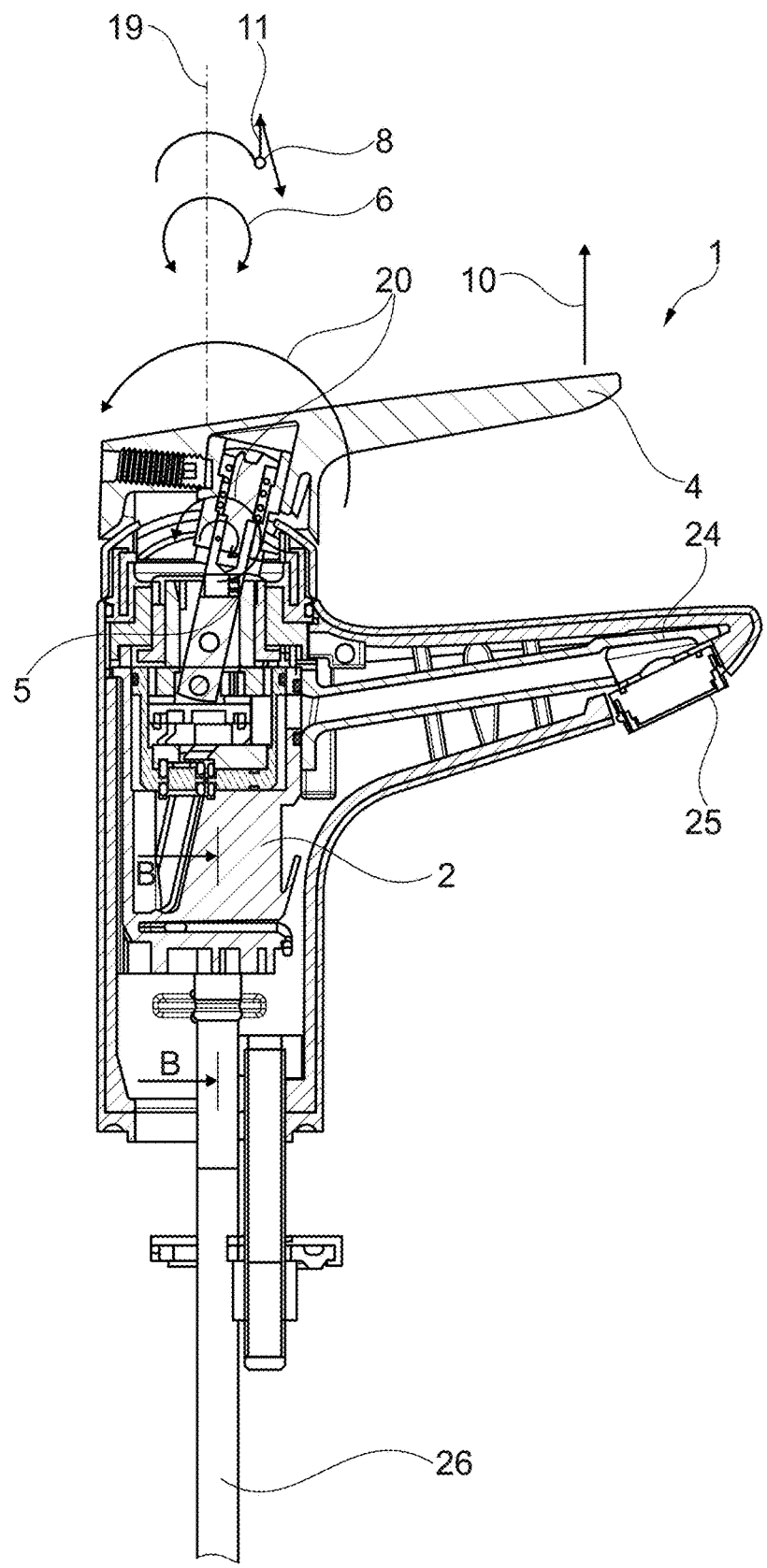

ment in the direction of more hot water is made possible beyond the threshold setting.

11 Claims, 3 Drawing Sheets

(56) References Cited

U.S. PATENT DOCUMENTS 6,283,447 B1 * 9/2001 Fleet ........................ E03C 1/041
                                                            251/285
2017/0370077 A1    12/2017 Schmitt et al.

* cited by examiner

WATER FAUCET WITH SCALD PROTECTION

The invention relates to a water faucet (in particular a water faucet for the sanitary sector, for bathrooms or kitchens). It is common for such faucets to have a cartridge that can be used to mix hot and cold water to create and provide a desired water temperature. The cartridge of the water faucet is usually operated via a lever that can be operated or moved in two directions. A movement in one direction changes the flow-rate setting and a movement in the other direction changes the mixing ratio of hot and cold water, in that way setting the temperature.

It is well known to provide so-called scald protection or a child safety lock for such water faucets. The purpose of scald protection or a child safety lock is to prevent the unintentional provision of very hot water and, in particular, the unexpected provision of very hot water. This is usually done by preventing the lever from moving to a setting that dispenses very hot water. However, this type of scald protection or child safety lock often hinders the desired operation of a water faucet when hot water is to be provided.

This invention addresses the problem of at least partially solving the issues explained with reference to the prior art. The aim here is to present a water faucet having scald protection or a child safety lock that is particularly convenient to use and is also very easy to design.

This problem is solved by the invention according to the features of the independent claim. Further advantageous embodiments are specified in the dependent claims and in the description and in particular also in the description of the figures. It will be appreciated that the person skilled in the art combines the individual features in a technologically meaningful way and in that way arrives at further embodiments of the invention.

The invention relates to a water faucet having an adjustable cartridge for the infinitely variable mixing of a cold-water flow and a hot-water flow to form a mixed-water flow, having a first adjustability by means of which the mixing ratio of cold water and hot water in the mixed-water flow can be set, and having an operating lever, which is connected to the first adjustability of the cartridge via a transmission mechanism such that the mixing ratio of cold water and hot water in the mixed-water flow can be set by a temperature setting motion of the operating lever, wherein the temperature setting motion is a rotary motion about an axis of rotation, wherein the transmission mechanism has at least one stop, which limits a movement of the first adjustability of the mixing ratio in the direction of more hot water at a threshold setting, wherein the stop is designed such that the operating lever is brought into an unlocking position by an unlocking motion deviating from the temperature setting motion, such that a further movement in the direction of more hot water beyond the threshold setting is rendered possible.

The design of the water faucet described here with an adjustable cartridge and an operating lever for operating the cartridge makes for an easy operation on the part of the user. The control lever can be used to conveniently and intuitively select two different settings, "temperature setting" and "flow-rate setting", because the control lever is set up in such a way that the two settings are decoupled as far as possible. Changing a temperature setting preferably does not usually change a flow-rate setting. Changing a flow-rate setting preferably does not change the temperature setting. At the very least, the temperature setting motion and the volume flow-rate setting motion of the operating lever should be designed in such a way that a user can quickly and intuitively set temperature and flow rate independently of each other. A transmission mechanism transmits the motion of the operating lever to the adjustabilities of the cartridge. The adjustabilities of the cartridge can be designed in different ways. Preferably, the cartridge also has a lever that is coupled to the operating lever via the transmission mechanism. However, other variants are also conceivable, in which, for instance, the flow rate is set by moving the cartridge axially and the temperature is set by rotating the cartridge.

In the water faucet described here, the transmission mechanism has a stop that limits a temperature setting motion towards higher temperatures or towards more hot water when a threshold position is reached, or a motion beyond a threshold setting towards more hot water is to be made. In particular, the transmission mechanism is designed in such a way that the operating lever has to be used to perform an unlocking motion to permit a further movement in the direction of more hot water. In particular, the unlocking motion is a different motion from the temperature setting motion and also from a flow-rate setting motion, which will be discussed in greater detail below.

It is particularly advantageous if the cartridge has a second adjustability, which can be used to set a volume flow of the mixed-water flow, wherein the operating lever and the transmission mechanism are designed such that a flow-rate setting motion of the operating lever deviating from the temperature setting motion can be transmitted to the second adjustability via the transmission mechanism to set a volume flow of the mixed-water flow, wherein the flow-rate setting motion is a tilting motion about a tilting axis.

The tilting motion about the tilting axis is preferably the operating lever being tilted upwards or tilted backwards. Such a motion usually requires an operating force that does not have to be clearly defined in terms of its force effect because the direction of tilting motion is defined by the (preferably fixed) tilting axis. If an operator presses on the operating lever from below in an undefined direction or if the user pulls on the operating lever from above in an undefined direction (e.g., by gripping the operating lever from below), the appliance tilts about the tilting axis and a flow-rate setting motion occurs.

It is particularly advantageous if the unlocking motion is a translatory motion along the axis of rotation.

A translatory motion along the axis of rotation is usually not as easy for an operator and, above all, not as intuitive. Preferably, such a motion describes the operating lever being pulled upwards in a uniform way along the operating axis. Preferably, the water faucet is set up in such a manner that the operator has to pull the operating lever upwards as a whole to perform the translatory motion. Preferably, the user has to guide the operating lever in parallel to the axis of rotation. This means in particular that it has to grip the operating lever and not just exert a pushing and/or pulling force on the operating lever in the direction of the axis of rotation. The user normally also has to exert a torque on the operating lever that compensates for a deviation of the effective axis of the push or pull force from the axis of rotation.

Preferably, the water faucet is set up in such a way that an unguided (undefined in its direction) push or pull on the operating lever without applying a torque to compensate for the position of the axes always leads to it tilting about the tilting axis. Preferably, the resistance that has to be overcome to perform a flow-rate setting motion in the form of a tilting motion is low compared to the resistance that has to be overcome to perform the unlocking motion (translatory motion along the axis of rotation).

It is particularly advantageous if the unlocking motion has a superimposed motion with a first directional component along a direction of the flow-rate setting motion, such that the transmission mechanism also simultaneously sets a volume flow via the second adjustability by means of the unlocking motion.

In particular, this means that by performing the unlocking motion at the second adjustability, a flow rate of water is set at the same time. This ensures that unlocking is not performed without water being supplied. Water is therefore always provided at a temperature that is lower than the temperature at the threshold setting before a further movement in the direction of more hot water is rendered possible. This prevents an operator from being suddenly surprised by the provision of hot water at temperatures above the threshold setting.

It is particularly advantageous if the unlocking motion and the unlocking position are arranged in such a way that a reduction of the volume flow to zero is prevented as long as the unlocking position is present.

The unlocked position is preferably continuously present when the water faucet supplies hot water at a temperature above the temperature defined by the threshold setting.

It is particularly advantageous if the stop component and the counterstop are designed in such a way that the unlocked position can only be overridden when a temperature setting motion of the operating lever sets the mixing ratio of cold water and hot water below a threshold setting.

Preferably, the water faucet always prevents the volume flow from being reduced to zero when water is supplied at temperatures above the temperature defined by the threshold setting. In other words: If the provision of water is to be interrupted, the operating lever has to be turned back such that when the provision of water is reactivated, water is always provided again at lower temperatures than the temperature defined by the threshold setting.

It is particularly advantageous if the stop is formed by a stop component which engages when the threshold is set and the unlocking motion raises the stop component and thus overcomes a counterstop on the water faucet.

In particular, the stop component forms at least one edge that is moved together with the operating lever when a temperature setting is made. As long as the threshold setting is not reached, the stop or the stop component can move freely. Preferably, there is a free space, in which the stop can be displaced up to the threshold setting. As soon as the threshold setting is reached, the stop preferably strikes a counterstop.

It is particularly advantageous if the stop component has at least one guide section which causes the stop component to be coupled to a temperature setting motion and to be at least partially decoupled from a flow-rate setting motion.

It is particularly advantageous if a guide section of the stop component couples the stop component to the axis of rotation in a translatory direction along the axis of rotation.

The unlocking motion raises or moves the stop upwards. Preferably, the stop component is directly coupled to the operating lever. Preferably, however, the stop component is coupled to the operating lever in such a way that a tilting motion for setting a volume flow is not transmitted to the stop component. In a preferred embodiment, the stop component has rail-like guide sections that guide the stop component with a rotary motion about the axis of rotation. Preferably, guide shoes are arranged on a transmission element for transmitting motions of the operating lever to the cartridge or the adjustabilities of the cartridge, which interact with the cartridge lever and permit the transmission of axial motions along the axis of rotation (unlocking motions), but slide on the guide section during tilting motions or flow-rate setting motions.

It is particularly advantageous if the stop comprises a stop component, which encompasses a transmission element of the transmission mechanism and is moved in a rotary motion about the axis of rotation during a temperature setting motion, wherein the stop component strikes against a counterstop of the water faucet when the threshold setting is reached and is displaced by the unlocking motion in a translatory motion along the axis of rotation into the unlocking position in such a way that it moves past the counterstop into an evasion space when the temperature setting motion is moved beyond the threshold setting towards more hot water.

It is particularly advantageous if a compression spring is used to couple the operating lever to the water faucet, wherein the compression spring counteracts the unlocking motion, such that a spring force of the compression spring has to be overcome in order to perform the unlocking motion and deactivates the unlocking position when a mixing ratio below the threshold setting is set and the spring force of the compression spring is not reached.

The compression spring preferably generates a force in the opposite direction to the unlocking motion, which force is maintained throughout when the unlocking position is reached. This force always brings the operating lever back to the locked position if a temperature setting below the threshold setting is set.

It is particularly advantageous if a counterstop, which acts in conjunction with the stop, is arranged on an inserted counterstop component of the water faucet.

Figure 2:
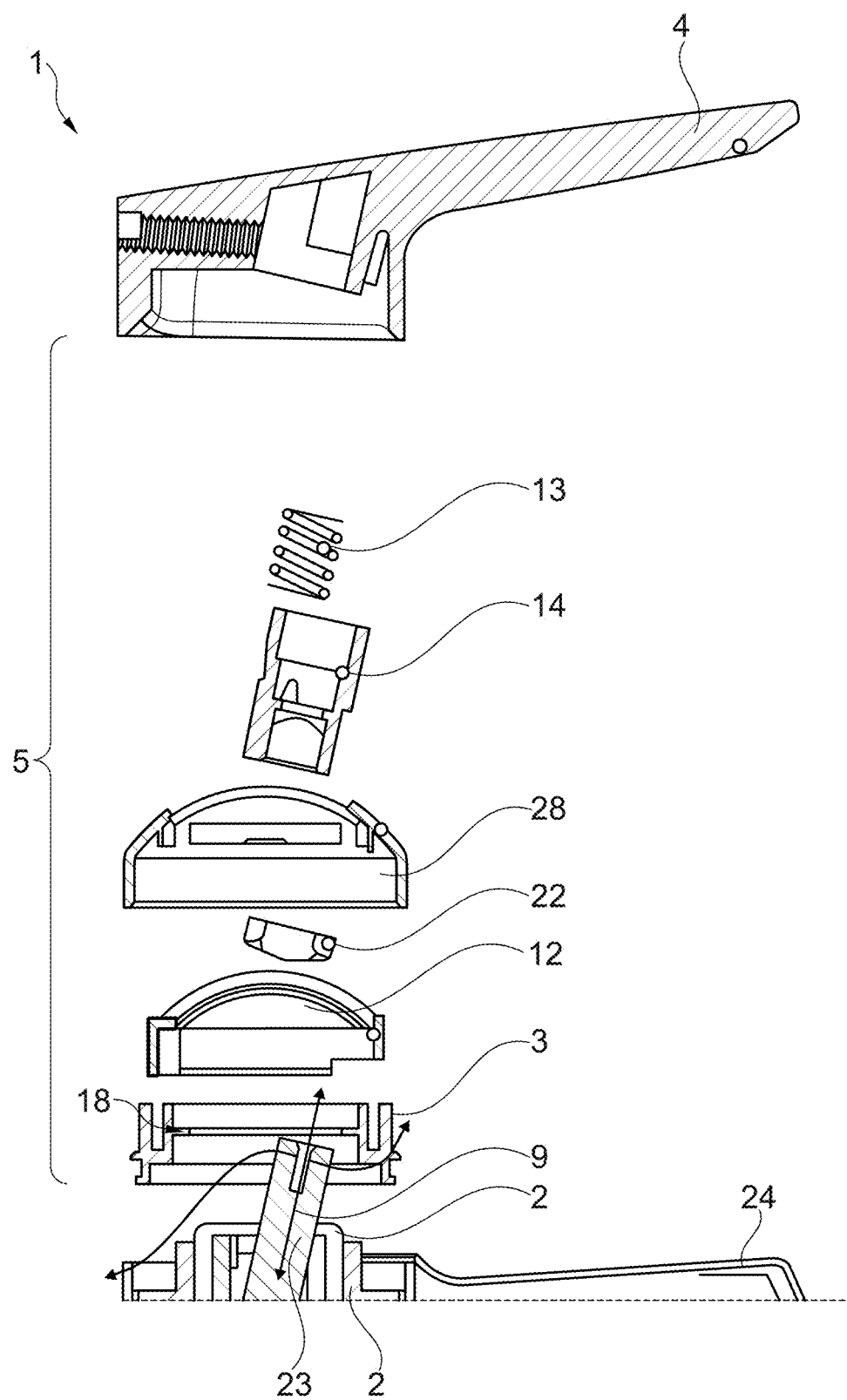

The invention and the technical environment of the invention are explained in more detail below with reference to the figures. The figures show preferred exemplary embodiments, but the invention is not limited to those. It should be noted in particular that the figures and in particular the proportions shown in the figures are purely schematic. In the figures, FIG. 1 shows a sectional view of a water faucet described;
FIG. 2 shows an exploded view of a water faucet; and
FIG. 3 shows a section of the mechanism inside a described water faucet.

Figure 3:
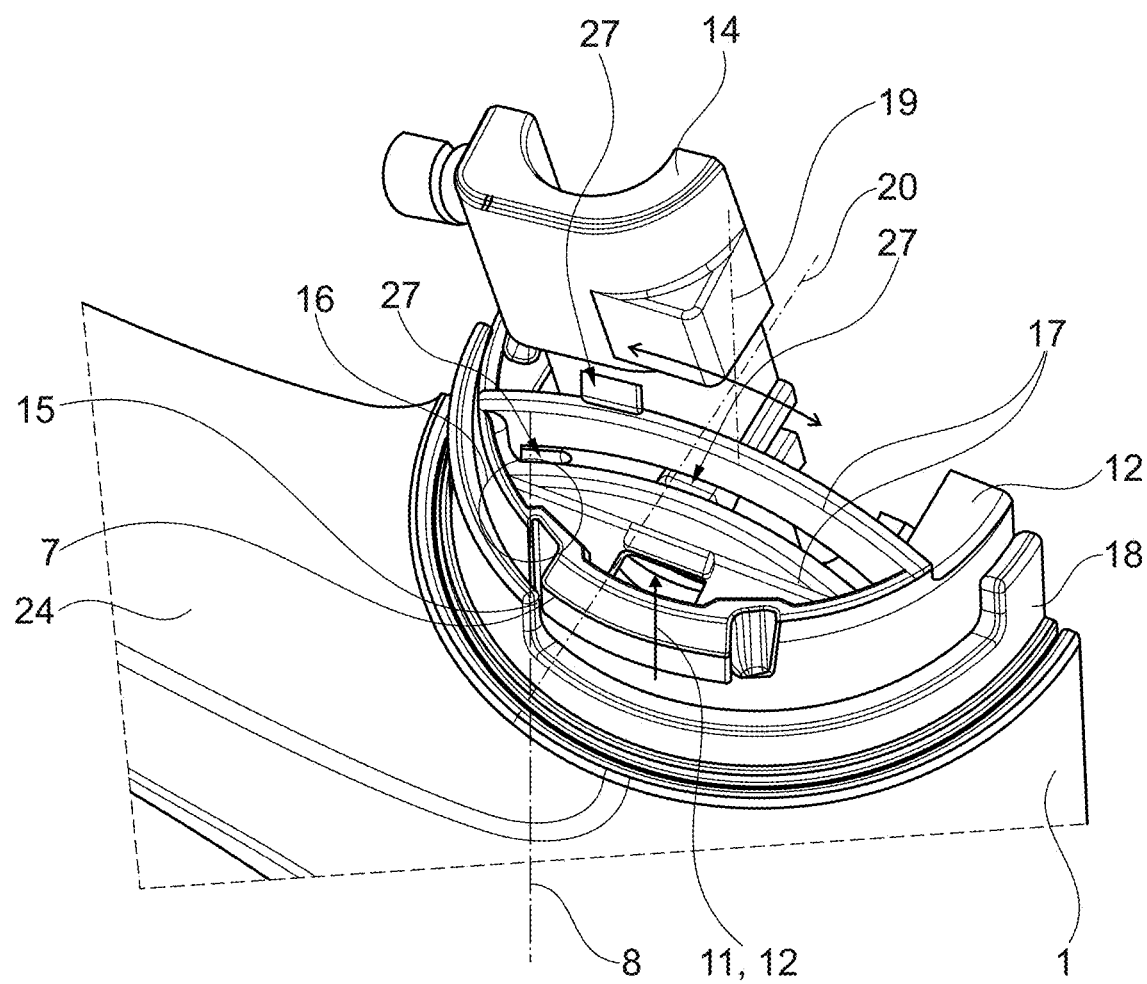

All FIGS. 1, 2 and 3 show a described water faucet 1 and the figures are explained in conjunction below. FIG. 1 is used to first explain the operation of a described water faucet 1 is in principle using a sectional view. The water faucet receives cold water and hot water via supply lines 26, which water is mixed in the cartridge 2 and then provided as mixed water at a desired target temperature via the outlet 24 having the discharge 25.

The control lever 4 can be used to set the mixing ratio of cold water and hot water and the respective flow rates of cold water and hot water. A flow-rate setting motion 10 provided as a tilting motion can be used to tilt the operating lever 4 about a tilting axis 20 to set a volume flow. The operating lever 4 can also be rotated about an axis of rotation 19 using a temperature setting motion 6 provided as a rotary motion to set the temperature of the water by setting the mixing ratio of cold water and hot water. The temperature setting motion 6 and the flow-rate setting motion 10 are transmitted from the operating lever 4 to the cartridge 2 by a transmission mechanism 5 to perform the necessary settings on the cartridge 2 to set the desired flow rate and the desired temperature of the water supplied.

FIG. 1 also shows an unlocking motion 11 that is necessary to unlock the operating lever in such a way that water temperatures can be set above the threshold setting. The mode of operation of the unlocking motion 11 and the means provided in the water faucet 1 to achieve this mode of operation are explained below with reference to FIGS. 2 and 3.

FIG. 2 shows a section of the water faucet 1 in an exploded view such that individual components of the water faucet 1 can be recognized more easily. The operating lever 4 is shown at the top. Shown at the bottom are the cartridge 2 with the cartridge lever 23 and sectionally the outlet 24. The various setting options are shown on the cartridge. A first adjustability 3 for setting the mixing ratio of cold water and hot water is a type of swivel motion of the cartridge lever 23, which can be used to open a passage for cold water and/or a passage for hot water in the cartridge to a greater or lesser extent, wherein when a passage for hot water is opened further, a passage for cold water is proportionally closed and vice versa. A second adjustability 9 for setting the flow rate of water is, for instance, a linear motion, in which a cartridge lever 23 is pulled out of the cartridge 2 or pushed into the cartridge 2 to set the flow-rate. The individual components of the transmission mechanism 5 are shown between the cartridge 2 and the operating lever 4. At the heart of the transmission mechanism 5 is a transmission element 14, which transmits the operating motions of the operating lever 4 to the cartridge lever 23 of the cartridge 2. A stop component 12 is coupled to the transmission element 14 by a screw connection 22 in such a way that it permits motions of the transmission element 14 (and thus also of the operating lever 4), wherein motions which override the described threshold setting 8 are blocked by a stop of the stop component 12 striking against a counterstop 15 of a counter-stop component18 (also shown). FIG. 2 also shows a cover cap 28, which covers the mechanism with the stop component 12 and the counterstop component in the assembled state inside the water faucet.

FIG. 3 now shows the stop component 12 with the stop 7, which can also be seen here, and the counterstop component 18 with the counterstop 15 in the water faucet 1 in three dimensions. To better classify the area of the interior shown here, the outlet 24 is also indicated in the background. In FIG. 3, the cover cap shown in the functional illustration in FIG. 2 is not shown or has been removed. The transmission element 14 can be seen, which ultimately forms a kind of extension of the cartridge lever 23 (not visible here because it is concealed) and which forms the connection to the operating lever 4 (also not visible here because it is not shown). FIG. 3 shows the threshold setting 8, in which the stop 7 and the counterstop 15 are in contact with each other. The stop component 12 has to be transferred to the unlocking position 21 by an axial unlocking motion 11 along the axis of rotation 19. An evasion space 16 is schematically indicated by a circle. The unlocking motion 11 raises the stop component 12 such that the stop 7 can move out of the way into this schematically indicated evasion space and a rotary motion about the axis of rotation 19 beyond the threshold setting 8 is possible.

The unlocking motion 11 is transmitted from the transmission element 14 to the stop component 12 by guide sections 17 of the stop component 12. The guide sections 17 are preferably designed in such a way that a rotary motion about the axis of rotation 19 is transmitted to the stop component 12, such that the rotary motion results in the stop 7 striking the counterstop 15 during the threshold setting 8. However, the guide sections 17 are also designed in such a way that a tilting motion about the tilting axis 20 is not transmitted and is possible. An unlocking motion that is executed axially to the axis of rotation 19 is preferably also transmitted to the stop component 12 for unlocking. The guide sections 17 are preferably surrounded by guide shoes 27, which are formed, for instance, as projections on the transmission element 14. The guide sections 17 and the guide shoes 27 preferably interact in such a way that a rotary motion of the operating element (not shown here) or of the transmission element 14 about the axis of rotation 19 and an axial motion of the operating element (not shown here) or of the transmission element 14 along the axis of rotation 19 are transmitted directly to the stop component. The tilting motion of the operating element (not shown here) or the transmission element 14 preferably (solely) results in a relative motion between the guide shoes 27 on the transmission element 14 and the guide sections 17, but not in a motion of the transmission element 14 itself.

Preferably, the unlocking motion 11 acts on the transmission element 14 in such a way that the unlocking motion 11 also results in a motion component that changes a flow-rate setting, such that a setting beyond a supply flow-rate of zero is necessary to exceed the threshold setting 8 and request hotter water. Such an embodiment has the advantage that when the threshold setting 8 is exceeded, the provision of water cannot be deactivated at the same time, but only when the level falls below the threshold setting 8 again. This ensures that the water faucet 1 or the operating lever does not remain locked in a position in which hot water is provided directly. To deactivate the provision of water, it is always necessary to return to positions in which the temperature of the water provided is below the threshold setting 8.

List of Reference Numerals and Terms 1 water faucet
2 cartridge
3 first adjustability
4 operating lever
5 transmission mechanism
6 temperature setting motion
7 stop
8 threshold setting
9 second adjustability
10 flow-rate setting motion
11 unlocking motion
12 stop component
13 pressure spring
14 transmission element
15 counterstop
16 evasion space
17 guide section
18 counterstop component
19 axis of rotation
20 tilting axle
21 unlocking position
22 screw connection
23 cartridge lever
24 outlet
25 discharge
26 supply line
27 guide shoe
28 cover cap

The invention claimed is:
1. A water faucet (1) having an adjustable cartridge (2) for the infinitely variable mixing of a cold-water flow and a hot-water flow to form a mixed-water flow, having a first adjustability (3), by means of which the mixing ratio of cold water and hot water in the mixed-water flow can be set, and having an operating lever (4), which is connected to the first adjustability (3) of the cartridge (2) via a transmission mechanism (5) such that the mixing ratio of cold water and hot water in the mixed-water flow can be set by a temperature setting motion (6) of the operating lever (4), wherein the temperature setting motion (6) is a rotary motion about an axis of rotation (19), wherein the transmission mechanism (5) has at least one stop (7), which limits a movement of the first adjustability (3) of the mixing ratio in the direction of more hot water at a threshold setting (8), wherein the stop (7) is designed such that the operating lever (4) is brought into an unlocking position (21) by an unlocking motion (11) deviating from the temperature setting motion, such that a further movement in the direction of more hot water is made possible beyond the threshold setting (8), wherein the cartridge (2) has a second adjustability (9) via which a volume flow of the mixed-water flow can be set, wherein the operating lever (4) and the transmission mechanism (5) are designed in such a way that a flow-rate setting motion (10) of the operating lever (4) deviating from the temperature setting motion (6) can be transmitted to the second adjustability (9) via the transmission mechanism (5) in order to set a volume flow of the mixed-water flow, wherein the flow-rate setting motion (10) is a tilting motion about a tilting axis (20).

2. The water faucet (1), according to claim 1, wherein the unlocking motion (11) is a translatory motion along the axis of rotation (19).

3. The water faucet (1) according to claim 1, wherein the unlocking motion (11) has a superimposed motion with a first directional component along a direction of the flow-rate setting motion (10), such that the transmission mechanism (5) also simultaneously sets a volume flow via the second adjustability (9) by means of the unlocking motion (11).

4. The water faucet (1) according to claim 1, wherein the unlocking motion (11) and the unlocking position (21) are arranged in such a way that a reduction of the volume flow to zero is prevented as long as the unlocking position (21) is present.

5. The water faucet (1) according to claim 4, wherein the stop component (12) and the counterstop (15) are designed in such a way that the unlocking position (21) can only be overridden when a temperature setting motion (6) of the operating lever (4) sets the mixing ratio of cold water and hot water below a threshold setting (8).

6. The water faucet (1) according to claim 1, wherein the stop (7) is formed by a stop component (12) which engages when the threshold is set (8) and the unlocking motion (11) raises the stop component (12) and thus overcomes a counterstop (15) on the water faucet (1).

7. The water faucet (1) according to claim 6, wherein the stop component (12) has at least one guide section (17), which causes the stop component (12) to be coupled to a temperature setting motion (6) and to be at least partially decoupled from a flow-rate setting motion (10).

8. The water faucet (1) according to claim 1, wherein the stop (7) comprises a stop component (12), which encompasses a transmission element (14) of the transmission mechanism (5) and is moved in a rotary motion about the axis of rotation (19) during a temperature setting motion (6), wherein the stop component (12) strikes against a counterstop (15) of the water faucet (1) when the threshold setting (8) is reached and is displaced by the unlocking motion (11) in a translatory motion along the axis of rotation (19) into the unlocking position (21) in such a way that it moves past the counterstop (15) into an evasion space (16) when the temperature setting motion (6) is moved beyond the threshold setting (8) towards more hot water.

9. The water faucet (1) according to claim 8, wherein a compression spring (13) is used to couple the operating lever (4) to the water faucet (1), wherein the compression spring (13) counteracts the unlocking motion (11), such that a spring force of the compression spring (13) has to be overcome to perform the unlocking motion (11) and deactivates the unlocking position (21) when a mixing ratio below the threshold setting (8) is set and the spring force of the compression spring (13) is not reached.

10. The water faucet (1) according to claim 1, wherein a guide section (17) of the stop component (12) couples the stop component (12) to the axis of rotation (19) in a translatory direction along the axis of rotation (19).

11. The water faucet (1) according to claim 1, wherein a counterstop (15), which interacts with the stop (7) and is disposed on an inserted counterstop component (18) of the water faucet.

* * * * *